Figure 1:
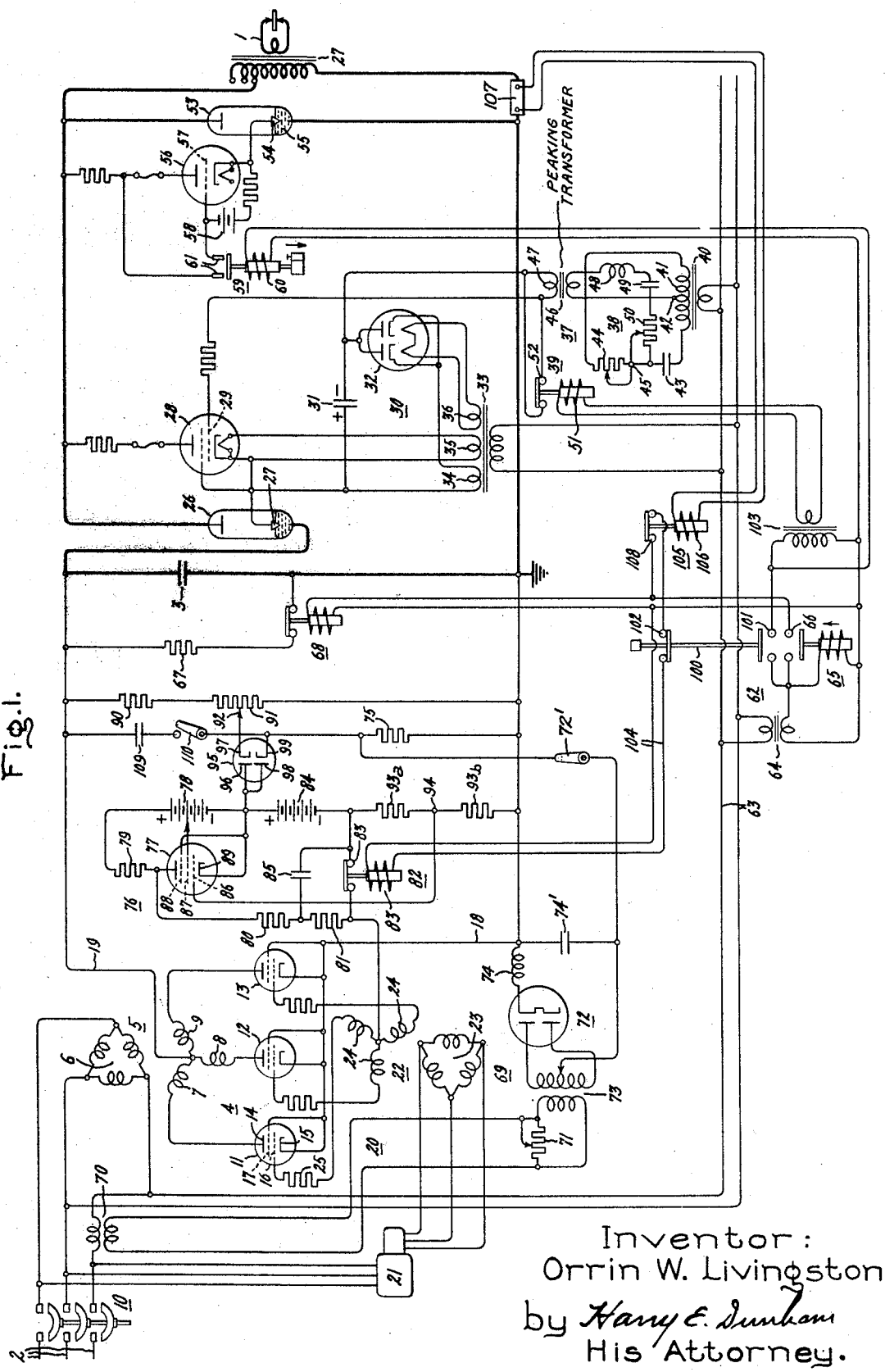

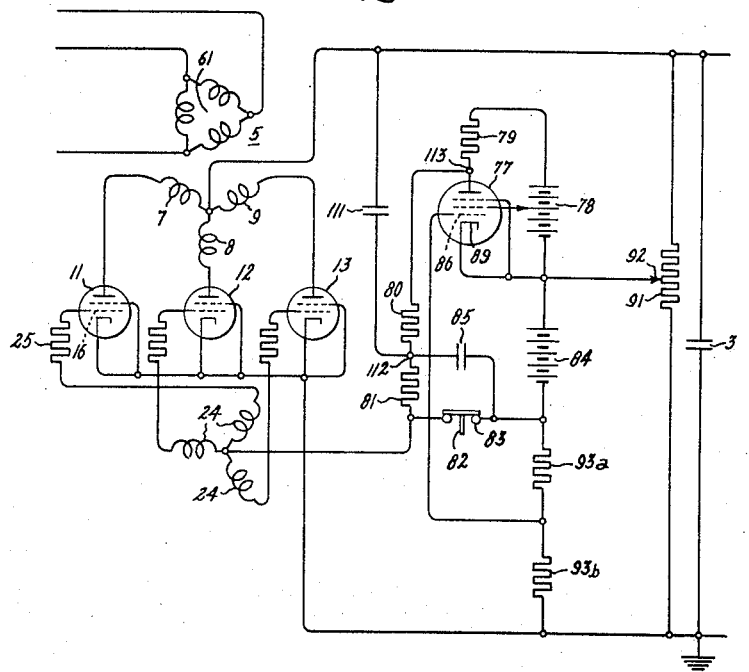

Patented Aug. 14, 1945

2,382,243

UNITED STATES PATENT OFFICE 2,382,243

ELECTRIC VALVE SYSTEM

Orrin W. Livingston, Scotia, N. Y., assignor to General Electric Company, a corporation of New York Application April 1, 1942, Serial No. 437,214

22 Claims. (Cl. 320—1)

My invention relates to electric valve systems and more particularly to electric valve control systems for controlling energy storage devices, such as capacitances.

In some applications, such as resistance welding applications, it is desirable to provide electric translating apparatus to transmit an impulse of current of relatively large magnitude to the welding circuit in order to effect a weld of the desired quality. Some of the arrangements devised heretofore consist in charging a capacitance from an alternating current supply circuit and in discharging the capacitance at the time when it is desired to produce a weld. For example, in the copending Rogers application Serial No. 404,853, filed July 31, 1941, there is described and claimed a system of this type in which a capacitance is charged from an alternating current supply circuit through a grid controlled rectifier. The rectifier control circuit includes a precharged capacitor which limits the initial charging rate of the capacitance. The Rogers application is prior art with respect to my invention. In accordance with the teachings of my invention described hereinafter, I provide new and improved electric translating apparatus and control circuits therefor whereby this type of operation may be effected at a relatively high rate, and in which the load imposed on the supply circuit is controlled.

It is an object of my invention to provide a new and improved electric translating system.

It is another object of my invention to provide new and improved electric valve translating apparatus.

It is a further object of my invention to provide new and improved electric valve control systems for charging a capacitance from a supply circuit.

It is a still further object of my invention to provide new and improved electric valve translating apparatus wherein a capacitance may be charged at a constant rate from an alternating current supply circuit, thereby controlling the load imposed on the supply circuit, and in which the capacitance is charged to a predetermined voltage.

Briefly stated, in the illustrated embodiment of my invention I provide a new and improved translating system of the energy storage type in which a capacitance is charged from an alternating current supply circuit through electric valve translating apparatus at a constant rate in order to control the maximum load imposed on the supply circuit. Control means are provided for maintaining a constant rate of rise of the capacitance voltage, and voltage responsive means are also employed for charging the capacitance to a definite predetermined voltage.

For a better understanding of my invention, reference may be had to the following description taken in connection with the accompanying drawings, and its scope will be pointed out in the appended claims. Fig. 1 diagrammatically illustrates an embodiment of my invention as applied to an energy storage system for energizing a welding circuit and which is energized from a polyphase alternating current supply circuit. Fig. 2 represents a further modification of my invention in which an improved control circuit is provided for obtaining a constant charging rate of the capacitance employed in the welding system.

Referring now to Fig. 1 of the drawings, I have there illustrated my invention as applied to a system for energizing a load circuit, such as a load circuit 1, from a polyphase alternating current supply circuit 2. The system employed is of the energy storage type and may comprise a capacitance 3 which is charged from the polyphase supply circuit 2 through charging means, such as a polyphase rectifier 4 comprising a transformer 5 including a plurality of primary windings 6 and secondary windings 7, 8 and 9. Circuit controlling means, such as a switch 10, may be connected between the supply circuit 2 and the transformer 5.

The rectifier 4 may comprise a plurality of unidirectional conducting devices of the controlled type, such as electric valve means 11, 12 and 13 which are preferably of the type employing an ionizable medium, such as a gas or a vapor, and each of which comprises an anode 14, a cathode 15 and a control means such as a grid 16. If desired, each of the electric valve means 11—13 may also be provided with an additional control grid or shield grid 17 which is connected to the associated cathode 15. The anode-cathode circuits of electric valve means 11—13 are connected to the capacitance 3 through conductors 18 and 19.

The conductivity of electric valve means 11—13 may be controlled or adjusted by means of an excitation circuit 20 which may be energized from the supply circuit 2 and may include suitable means for adjusting the phase of the resultant voltage impressed on the control grids 16. This phase shifting means may be one of the rotating type, such as a rotary phase shifter 21. The amount of current transmitted by electric valve means 11—13, and hence the charging current transmitted to capacitance 3, is determined by the resultant voltage impressed on grids 16. In the modification of my invention illustrated, the resultant voltage impressed on grids 16 may comprise two components one of which is the alternating voltage impressed on the grids 16 by means of the excitation circuit 20. These alternating components of voltage may be produced by connecting a transformer 22 in circuit in the manner illustrated wherein the primary windings 23 are energized from the output circuit of the rotary phase shifter 21 and the secondary windings 24 are connected to the grids 16 through current limiting resistances 25. The second component of voltage impressed on the grids 16 is a unidirectional component of voltage which is variable in magnitude. The manner in which this unidirectional component of voltage is produced is explained hereinafter.

I employ suitable means for discharging the capacitance 3 to effect energization of the welding circuit 1. This means may comprise a circuit controlling means, such as electric valve means 26, which is connected in circuit with the capacitance 3 and the primary winding of transformer 27 which is connected to the welding circuit 1. The electric valve means 26 is preferably of the type employing an ionizable medium and may include a control member 27 of the immersion-igniter type which when energized by a current of sufficient magnitude establishes an arc discharge within the electric valve means. The control member 27 may be energized by a control electric valve 28 which is provided with an anode-cathode circuit connected between the anode of the electric valve means 26 and the control member 27. The control electric valve 28 may be of the type employing an ionizable medium, if desired, and includes a control grid 29 the potential of which is selectively varied to render the electric valve 28 and the electric valve means 26 conductive.

The control electric valve 28 and the electric valve means 26 are maintained in a nonconducting condition except during the periods of discharge of capacitance 3. The control electric valve 28 and the electric valve means 26 may be maintained nonconducting by means of a control circuit 30 comprising a capacitance 31 which is charged to the polarity indicated by a rectifier 32 and a transformer 33. Transformer 33 is provided with a secondary winding 34 which is connected to the anode-cathode circuit of the rectifier 32 and capacitance 31. Transformer 33 may also be provided with secondary windings 35 and 36 which serve as sources of cathode heating current for the electric valve 28 and rectifier 32.

As a means for rendering the electric valve 28 conducting and hence as a means for rendering the electric valve means 26 conducting, I employ a circuit 37 including a phase shifting circuit 38 and a relay 39 which, when the relay is energized, impresses on the grid 29 of the electric valve 28 a peaked voltage sufficient to overcome the effect of the biasing potential supplied by capacitance 31. Phase shifting circuit 38 may be of the static impedance type, that is one in which an adjustable phase alternating voltage is furnished by adjustable impedance elements, and may include a transformer 40 having a secondary winding 41 provided with an electrical intermediate or neutral connection 42. One branch of the phase shifting circuit 38 includes a reactive element, such as a capacitance 43, and the other branch may include an adjustable resistance 44. The adjustable phase voltage is obtained from the common juncture 45 of the capacitance 43 and resistance 44 and the intermediate connection 42, and this adjustable phase voltage is supplied to a peaking device, such as a peaking transformer 46, the primary winding of which is connected to these points through a suitable filtering arrangement which may comprise an inductance 48, a capacitance 49 and an adjustable resistance 50.

Relay 39 is provided with an actuating coil 51 and contacts 52 and is normally mechanically biased to the closed circuit position so that the peaked voltage appearing across secondary winding 47 is rendered ineffective, thereby permitting the biasing potential of capacitance 31 to maintain the control electric valve 28 in a non-conducting condition.

In order to prevent substantial reversal in the polarity of the voltage appearing across the primary winding of transformer 27 and, hence, for limiting the magnitude of the reverse voltage or charge of capacitance 3, I connect across the primary winding of transformer 27 a unidirectional conducting device such as an electric valve means 53 which is also preferably of the type employing an ionizable medium, and which may include an immersion-igniter type control member 54 associated with cathode 55. Electric valve means 53 is also provided with a control electric valve 56, which may employ an ionizable medium and which includes a control member or grid 57. Electric valve 56 is normally maintained nonconducting by means of a suitable source of negative biasing or hold-off potential furnished by a battery 58. The electric valve 56 is connected to the anode-cathode circuit of the electric valve means 53 and is connected between the anode and the control member 54 thereof.

I employ control means for selectively rendering conducting and nonconducting the control electric valve 56 and its associated main electric valve means 53. This control means may be of the type disclosed and claimed in a copending patent application Serial No. 384,247, filed March 20, 1941, upon an application of Louis G. Levoy, Jr. and which is assigned to the assignee of the present application. This timing means may comprise a relay 59 which may comprise an actuating coil 60 and contacts 61. The relay 59 is designed to close its contacts 61 substantially instantaneously upon the energization of actuating coil 60 and to maintain the contacts 61 closed for a predetermined definite interval of time, at the expiration of which the contacts 61 are opened and maintained open until the actuating coil 60 is deenergized. When the contacts 61 are closed, the grid 57 of electric valve 56 is connected to the anode-cathode circuit thereof and is also connected to the anode of electric valve means 53 so that as soon as the voltage of capacitance 3 tends to reverse polarity the electric valve means 53 is rendered conducting, thereby providing a short circuit path for the flow of electric current due to the stored electromagnetic energy of transformer 27.

A control circuit 62 is employed for initiating operation of the system, that is for initiating the charging operation of the capacitance 3 and for initiating discharge of the capacitance 3, thereby energizing the welding circuit 1. Circuit 62 may be energized from the supply circuit 2 through circuit 63 and transformer 64 and comprises a relay 65 which is designed to close its contacts 66 with a predetermined time delay so that initiation of the system may not be begun until the cathodes of the electric valves of the filamentary type have been afforded a sufficient time to assume a safe operating temperature. Relay 65 may also be employed to open a protective or short circuiting path around the capacitance 3. This protection may be afforded by means of a discharge path comprising a resistance 67 which is connected across the terminals of capacitance 3 by means of a relay 68. As soon as the relay 65 closes its contacts, relay 68 is energized, thereby opening the discharge path around the capacitance 3.

I provide means for limiting the charging current of capacitance 3 so that the current is initially maintained at a substantially constant value until the voltage of the capacitance attains the desired value, at which time the normal "full-on" rate of the rectifier 4 becomes less than the preset limit. The charging of the capacitance 3 is then continued at a progressively lower value of current. This means for controlling the charging rate of the capacitance may be arranged so that the capacitance 3 is charged at constant current until the voltage of the capacitance attains a first predetermined value, at which time the charging current of the capacitance 3 is maintained to bring the voltage of the capacitance to a second or final predetermined value.

This manner or method of charging capacitance 3 is obtained by superimposing on the alternating components of voltage impressed on grids 16 of electric valve means 11—13 a variable unidirectional voltage which is determined or controlled by control apparatus described immediately hereinafter. More particularly, I may employ a current responsive means 69 which is energized in response to the charging current of capacitance 3. In the arrangement illustrated, the alternating current which is responsive to the charging current is employed as an indicant of the charging current for capacitance 3. It will, of course, be understood that I could employ other current responsive means such as a shunt connected in circuit with conductor 18 or conductor 19, or that I may employ polyphase current responsive means connected in circuit with the primary windings 6 of transformer 5. A transformer 70 which is connected to be responsive to the current of one phase of the polyphase system produces across the terminals of an adjustable resistor 71 a voltage which varies in response to the charging current. This alternating voltage may be converted into a unidirectional voltage by means of a rectifier 72 which is energized from a secondary winding of a transformer 73 which, in turn, is energized in response to the voltage appearing across resistance 71. Suitable filtering means, such as an inductance 74 and a capacitance 74', may be connected across the output circuit of the rectifier 72. Rectifier 72 produces across the terminals of an impedance element, such as a resistance 75, a unidirectional voltage the magnitude of which varies in response to the magnitude of the charging current for capacitance 3.

I provide amplifying means 76 which is selectively responsive to the charging current of the capacitance 3 and to the magnitude of the voltage of capacitance 3. This amplifier may comprise an electric discharge device 77 energized from a suitable source of direct current, such as a battery 78, and which transmits variable amounts of unidirectional current through an impedance element, such as a resistance 79, to control the potential impressed on grids 16 of electric valve means 11—13, inclusive. The lower terminal of resistance 79 may be connected to the grids 16 through secondary windings 24 of transformer 22 through a circuit including resistances 80 and 81.

I provide means, such as a relay 82, which when in a deenergized condition maintains its contacts 83 closed to impress a negative unidirectional biasing potential on the grids 16, thereby maintaining the electric valve means 11—13 nonconducting. This biasing potential may be obtained from a suitable source such as a battery 84. Anti-hunting means, such as a capacitance 85, may be connected between the battery 84 and the common juncture of resistances 80 and 81 in order to control the rate at which the control system initiates the charging operation of capacitance 3 and to prevent overshooting of the voltage to which the capacitance 3 is to be charged ultimately.

The electric discharge device 77 is preferably of the high vacuum type comprising a control grid 86, a second control member such as a screen grid 87, and may include a suppressor grid 88 which is connected to the cathode 89.

I provide means, such as a voltage divider, responsive to the voltage of the capacitance 3. This voltage divider may comprise resistances 90 and 91, the latter of which is provided with an adjustable contact 92. I provide a second means, which is also responsive to the voltage of the capacitance 3, and which may comprise a voltage divided including a single resistance or a pair of resistances 93a and 93b, the common juncture 94 of which is connected to control grid 86 of electric discharge device 77. This latter mentioned voltage responsive means is energized in accordance with the voltage of contact 92 as will be described in more detail at a later point in the specification.

As a means for rendering the amplifier means 76 selectively responsive to the charging rate of the capacitance 3 and the voltage of the capacitor, I provide an electric discharge device 95 which comprises a pair of electric discharge paths one of which is responsive to the voltage appearing across the resistance 75 and the other of which is responsive to a component of the voltage provided by resistance 91. More specifically, the discharge path comprising anode 96 and cathode 97 is connected to adjustable contact 92, and the anode 98 and the cathode 99 are connected in circuit with resistance 75. The anodes 96 and 98 are preferably joined and are connected to cathode 89 of discharge device 77.

To initiate discharge of the capacitance 3 and for maintaining the rectifier 4 nonconducting during the discharge of capacitance 3, I provide a circuit controlling means such as a switch 100 which is normally biased to the position indicated and which includes two pairs of contacts 101 and 102. When switch 101 is depressed, transformer 103 is energized thereby effecting energization of relay 39 which initiates a series of operations to effect discharge of capacitance 3 through electric valve means 26. Normally closed contacts 102 of switch 100 are connected in circuit 104. Circuit 104 is energized from circuit 63 through transformer 64, so that relay 82 is energized thereby placing the charging apparatus in operation by removing the negative unidirectional biasing potential from grids 16 of electric valve means 11, 12 and 13. As a means for preventing operation of the rectifier 4 in response to th scharge current of capacitance 3, if the switch 1 is released before the discharge is completed provide a current responsive means such as relay 105 having an actuating coil 106 which ay be energized from a shunt 107 connected the discharge circuit for capacitance 3. Norally closed contacts 108 of relay 105 are concted in circuit with contacts 102 of switch 100 d the actuating coil of relay 82. Relay 105 designed to maintain its contacts 108 open so 1g as the discharge current of capacitance 3 nains above a predetermined value.

If desired, the substantially constant rate of arge of capacitance 3 may be obtained by em)ying a capacitance 109 connected in series with istance 75 across the terminals of capacitance in which case the current responsive means would not be used. A suitable switch 110 may connected in circuit with the capacitance 109. 1en the capacitance 109 is employed, the volt- appearing across resistance 75 remains sub.ntially constant for a constant charging curit or a constant rate of charging of the capaciice 3. Switch 72' may be employed as a ans for selectively connecting and disconnect: the circuit 72.

The operation of the embodiment of my inition shown in Fig. 1 will be explained by conering the system when it is desired to effect transmission of an impulse of welding curt to the welding circuit. Switching means 10 :losed, thereby effecting energization of circuit The electric valve means 11—13 are main1ed nonconducting by virtue of the negative directional biasing potential impressed on 1s 16 by means of battery 84 and relay 82. er the expiration of a predetermined time delay 1blished by time delay relay 65, contacts 66 reof are closed effecting energization of the uating coils of relays 68 and 82. When relay is energized, the discharge path around caitance 3 is opened and when relay 82 is ener:d the negative unidirectional biasing potential ressed on grids 16 by battery 84 is removed. charging operation is initiated when con:s 83 of relay 82 are opened. The alternating iponents of voltage impressed on grids 16 of tric valve means 11—13 may be adjusted to ing a lagging phase relationship with respect he respective anode-cathode voltages of these tric valve means, and I have found that a se displacement of substantially 90 electrical :ees is satisfactory. Electric valve means 26 53 are maintained nonconducting so that the icitance 3 cannot be discharged.

he capacitance 3 is charged at a substan.y constant rate; that is, the charging cur of the capacitance is maintained constant the voltage of capacitance 3 rises linearly. constant charging of capacitance 3 is accom1ed in the following manner. The current onsive means 69 which is energized from sformer 70 produces a unidirectional voltacross resistance 75. If the charging curtends to rise above or fall below the desired tant charging current, the voltage across re.nce 75 correspondingly varies, causing a 1ge in potential of cathode 89 of electric disge device 77, thereby varying the unidirec1l component of voltage impressed on grids electric valve means 11—13 and thereby reng the charging current to the desired value. charging of capacitance 3 at a constant rate aintained until the voltage of capacitance 3 attains a predetermined value established by the adjustment of contact 92 of resistance 91. When the component of voltage produced by the lower portion of resistance 91 exceeds the value of unidirectional voltage produced by resistance 75, the system changes from current response to voltage response. That is, the control of the discharge device 77 is transferred from current response to voltage response by the transfer of the current from the lower discharge path, comprising anode 98 and cathode 99, to the upper discharge path comprising anode 96 and cathode 97. The system then operates to charge the capacitance 3 to the predetermined voltage established by the system. The manner in which this latter operation is effected is obtained by the use of the component of voltage provided by resistances 90 and 91 and the component of voltage impressed on grid 86 of discharge device 77 through resistance 93b. As the voltage approaches the predetermined value, the potential of the cathode 89 is gradually lowered, thereby increasing the magnitude of the negative biasing potential impressed on grids 16 of electric valve means 11—13 by virtue of the transmission of a greater amount of current through the resistance 79. When the voltage of the capacitance 3 attains the predetermined value, the potential difference between grid 86 and cathode 89 of discharge device 77 is sufficient to increase the negative voltage impressed on grids 16 of electric valve means 11—13 to a value which maintains the electric valve means nonconducting. Due to the fact that a voltage divider comprising resistances 90 and 91 is connected across the capacitance 3, if the discharge of the capacitance 3 is not initiated immediately after the charging thereof some of the charge may be dissipated through this circuit. My system responds to trickle charge the capacitance 3 if the charge of the capacitance tends to decrease appreciably.

Energization of the welding circuit 1 is effected by operation of switch 100. When switch 100 is depressed, contacts 101 are closed effecting energization of transformer 103 which energizes relay 39. Relay 59 is also energized by the closure of contacts 101. Upon operation of relay 39, the voltage of peaked wave form produced by transformer 46 renders the control electric valve 28 and the electric valve means 26 conducting, thereby discharging the capacitance 3 through a circuit including the primary winding of transformer 27 and the anode-cathode circuit of electric valve means 26. Due to the fact that the discharge circuit for capacitance 3 includes appreciable inductance, the circuit is oscillatory and consequently there is a tendency to build up a reverse charge across the terminals of the capacitance 3. The electric valve means 53 prevents or limits this reverse charge from attaining a voltage appreciably in excess of the arc drop of the electric valve means. Relay 59 is adjusted so that it maintains its contacts 61 closed for a period of time which extends into the region into which the voltage of the capacitance 3 tends to reverse polarity. As soon as the voltage tends to reverse the control electric valve 56 and electric valve means 53 are rendered conducting, thereby providing a circulating path for the flow of current due to the electromagnetic energy stored in the transformer 27 thereby preventing any substantial reversal in polarity of the capacitance voltage. Relay 59 is designed to open its contacts as soon as electric valve 53 conducts current.

During the discharging operation of capacitance 3, the electric valve means 11—13 have been maintained nonconducting by virtue of the negative unidirectional biasing potential impressed on grids 16 by means of relay 82. When the switch 100 was operated its contacts 102 were opened, thereby deenergizing relay 82 and effecting closure of its contacts 83 whereby the negative terminal of battery 84 was connected to the grids 16.

The current responsive relay 105 prevents initiation of the recharging operation of capacitance 3 so long as the discharge current of the capacitance remains above a predetermined value. Relay 105 maintains its contacts 108 open so that even if switch 100 is released prior to the complete discharge of capacitance 3 the recharging operation will not be initiated. As soon as the discharge current decreases below a predetermined value or decreases to zero, the relay 105 is deenergized, and if the switch 100 is released, relay 82 is again energized causing the initiation of a subsequent charging operation of capacitance 3. A subsequent energization of welding circuit 1 may then be initiated by operation of switch 100 in the manner described immediately above.

The operation of the system will now be explained when the current responsive means 69 is not employed and when the switch 110 is closed and switch 72' is open. The voltage divider comprising capacitance 109 and resistance 75 is employed as a circuit responsive to the voltage and the charging current of capacitance 3. If the capacitance is charged at a substantially constant rate, the voltage appearing across the resistance 75 remains constant. This will be appreciated by considering a constant rate of rise of voltage across capacitance 3 due to a constant charging thereof. Under these conditions, the rate of rise of the voltage across capacitance 109 and resistance 75 will also be constant and the flow of current through the resistance 75 is constant producing across its terminals a constant voltage. Variations in voltage appearing across resistance 75 control the potential of cathode 89 of electric discharge device 77 and vary the magnitude of the unidirectional biasing potential impressed on grids 16 of the electric valve means 11—13, inclusive. In this arrangement a constant charging of the capacitance 3 is obtained until the voltage of the capacitance attains a desired value, at which time the control transfers from current response to voltage response in the manner described above.

Fig. 2 represents another modification of my invention wherein the capacitance 3 is charged at a substantially constant rate. Certain of the elements have been assigned reference numerals corresponding to elements of the arrangement shown in Fig. 1. In the arrangement of Fig. 2 I provide a capacitance 111 which comprises an element of a circuit responsive to the voltage of capacitance 3. More particularly, the capacitance 111 is connected to the common junction 112 of resistances 80 and 81 and is also connected in circuit with resistance 79, battery 78 and the lower portion of resistance 91. The arrangement of Fig. 2 is intended to control the potential of the point 113 in response to the rate of rise of the voltage of capacitance 3, so that a constant rate of rise of this voltage is maintained. As explained above, if the voltage appearing across capacitance 3 tends to deviate from a constant rate of rise, the system operates to restore the charging current to the desired value. If, for example, the capacitance 3 tends to charge too rapidly as would occur when the charging current is too large, the voltage across capacitance 3 would rise very rapidly. This would tend to cause the upper plate of capacitance 111 to become negative very rapidly, and since the charge on capacitance 111 does not vary instantaneously, the lower plate thereof would also be pulled negative for a period of time sufficient to recharge capacitance 111 to the new value through resistances 80 and 79 and the lower portion of resistance 91. However, this lowering in potential of the lower plate of capacitance 111 lowers the potential impressed on grids 16 of electric valve means 11—13, thereby tending to limit the magnitude of the current transmitted to capacitance 3. In like manner, if the charging current tends to decrease below the desired value, the reverse operation takes place tending to increase the charging current to the desired value.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a supply circuit, a capacitance, electric valve means connected between said supply circuit and said capacitance and having a control member for controlling the conductivity thereof, means responsive to the current conducted by said electric valve means and connected to said control member for charging said capacitance at a constant rate, and means for controlling the last mentioned means to charge said capacitance to a predetermined voltage.

2. In combination, a supply circuit, a capacitance, means connected between said supply circuit and said capacitance for charging said capacitance, current responsive means for controlling the first mentioned means for charging said capacitance at a constant rate, means responsive to the voltage appearing across said capacitance, and means selectively responsive to the current responsive means and said voltage responsive means for controlling said first-mentioned means in response to said voltage responsive means when the voltage of said capacitance reaches a predetermined value.

3. In combination, a supply circuit, a capacitance, electric valve means connected between said supply circuit and said capacitance for charging said capacitance, said electric valve means having a control member, current responsive means connected to said control member for effecting charge of said capacitance at a constant rate, a voltage divider connected across said capacitance for producing a component of voltage which varies as the voltage of said capacitance, and means responsive to the voltage produced by said current responsive means and said voltage divider for controlling said electric valve means to charge said capacitance to a predetermined final voltage.

4. In combination, a supply circuit, a capacitance, electric valve means connected between said supply circuit and said capacitance for charging said capacitance, said electric valve means having a control member, means responsive to the current transmitted by said electric valve means for impressing a control voltage on said control member to charge said capacitance at a constant rate, means for producing a second control voltage responsive to the magnitude of the voltage of said capacitance, and means comprising an electric discharge means having a pair of electric discharge paths one of which is responsive to said first mentioned control voltage and the other of which is responsive to said second control voltage to effect transfer of the control of said electric valve means from current responsive to voltage responsive when the voltage of said capacitance attains a predetermined value.

5. In combination, a supply circuit, a capacitance, electric valve means connected between said supply circuit and said capacitance and having a control member for controlling the conductivity thereof, means responsive to the current conducted by said electric valve means for producing a control voltage, an amplifier comprising an electric discharge device and connected between the last mentioned means and said control member for controlling the potential of said control member in response to said control voltage and for effecting charge of said capacitance at a constant rate, and means responsive to the voltage of said capacitance for controlling said electric discharge device and for effecting charge of said capacitance to a predetermined voltage.

6. In combination, a supply circuit, a capacitance, electric valve means connected between said supply circuit and said capacitance and having a control member for controlling the conductivity thereof, means responsive to the current conducted by said electric valve means for producing a control voltage which varies in response to the magnitude of the charging current, an amplifier connected to the last mentioned means and to said control member and responsive to said control voltage for controlling said electric valve means to effect charge of said capacitance at a constant rate, and means responsive to the voltage of said capacitance for controlling said amplifier and for modifying the effect of the current responsive means to charge said capacitance to a predetermined voltage.

7. In combination, a supply circuit, a capacitance, electric valve means connected between said supply circuit and said capacitance and comprising a control member for controlling the conductivity thereof, means responsive to the current conducted by said electric valve means for producing a control voltage, an amplifier connected in circuit with said control member and said last mentioned means and comprising an electric discharge device, means responsive to the voltage of said capacitance, and means connected between the voltage responsive means and the current responsive means for rendering said amplifier selectively responsive to said voltage responsive means and said current responsive means for charging said capacitance at a constant rate and to a predetermined voltage.

8. In combination, a supply circuit, a capacitance, electric valve means connected between said supply circuit and said capacitance and comprising a control member for controlling the conductivity thereof, means responsive to the current conducted by said electric valve means for producing a control voltage, an amplifier connected in circuit with said control member and said last mentioned means and comprising an electric discharge device, means responsive to the voltage of said capacitance, and an electric discharge device selectively responsive to the voltage of said capacitance and said control voltage for controlling the operation of said electric valve means to charge said capacitance to a predetermined voltage.

9. In combination, a supply circuit, a capacitance, means for charging said capacitance comprising electric valve means connected between said supply circuit and said capacitance and comprising a control member for controlling the conductivity thereof, means responsive to the charging current for producing a control voltage which varies in magnitude in response to the magnitude of said charging current, an amplifier connected in circuit with said control member and the current responsive means for controlling the potential of said control member so that said capacitance is charged at a constant rate, a load circuit, means connected between said capacitance and said load circuit for discharging said capacitance and for effecting energization of said load circuit, means for initiating operation of said last mentioned means, and means responsive to the discharge current of said capacitance for maintaining said electric valve means nonconducting.

10. In combination, a supply circuit, a capacitance, means for charging said capacitance comprising electric valve means connected between said supply circuit and said capacitance and comprising a control member for controlling the conductivity thereof, means responsive to the charging current for producing a control voltage which varies in magnitude in response to the magnitude of said charging current, an amplifier connected in circuit with said control member and the current responsive means for controlling the potential of said control member so that said capacitance is charged at a constant rate, a load circuit, means connected between said capacitance and said load circuit for discharging said capacitance and for effecting energization of said load circuit, means for initiating operation of said last mentioned means, and means responsive to the discharge current of said capacitance for impressing a hold-off voltage on said control member to maintain said electric valve means nonconducting so long as the discharge current of said capacitance exceeds a predetermined value.

11. In combination, a supply circuit, a capacitance, charging means for said capacitance connected between said supply circuit and said capacitance and comprising an electric valve means having a control member, means responsive to the charging current of said capacitance for controlling the potential of said control member to effect charge of said capacitance by said electric valve means at a constant rate, means responsive to the voltage of said capacitance for modifying the effect of said last mentioned means so that said capacitance is finally charged to a voltage of predetermined magnitude, a load circuit, circuit controlling means connected between said capacitance and said load circuit for discharging said capacitance and for effecting energization of said load circuit, means for initiating operation of said circuit controlling means including means for impressing a hold-off voltage on said control member thereby rendering said electric valve means nonconducting, and means responsive to the discharge current of said capacitance for preventing conduction by said electric valve means so long as the discharge current of said capacitance exceeds a predetermined value.

12. In combination, a source of current, a capacitance, means connected between said source and said capacitance for charging said capacitance, and control means for said last mentioned means to charge said capacitance at a substantially constant rate comprising a voltage divider responsive to the voltage of said capacitance and comprising in series relation a capacitance and a resistance and means responsive to the voltage across said resistance for maintaining the voltage across said resistance at a substantially constant value thereby maintaining the charging current of the first mentioned capacitance at a substantially constant value.

13. In combination, a supply circuit, a capacitance, means connected between said supply circuit and said capacitance and comprising an electric valve means having a control member, control means for impressing a variable unidirectional voltage on said control member to control the current conducted by said electric valve means and comprising a voltage divider including in series relation a capacitance and a resistance responsive to the voltage of said first mentioned capacitance, the voltage across said resistance remaining constant for a constant rate of rise of the voltage of the first mentioned capacitance.

14. In combination, a supply circuit, a capacitance, means for charging said capacitance connected between said supply circuit and said capacitance and comprising electric valve means having a control member, amplifier means comprising an electric discharge device for producing a unidirectional voltage and means for controlling the operation of said electric discharge device and for controlling the potential impressed on said control member to charge said capacitance at a constant rate comprising means responsive to the voltage of said capacitance and including in series relation a second capacitance and a resistance connected to said electric discharge device, the voltage across said resistance remaining constant for a constant rate of rise of the voltage of the first mentioned capacitance.

15. In combination, a supply circuit, a capacitance, means connected between said supply circuit and said capacitance and comprising an electric valve means for charging said capacitance, said electric valve means including a control member for controlling the current conducted thereby, amplifier means comprising an electric discharge device for impressing a unidirectional voltage on said control member, and means for controlling the magnitude of said unidirectional voltage for effecting charging of said capacitance at a constant rate comprising means responsive to the voltage of said capacitance and including in series relation a second capacitance and a resistance, said second capacitance and said resistance serving to modify the operation of said electric discharge device in response to deviations from a constant rate of rise of the voltage of said first mentioned capacitance.

16. In combination, a supply circuit, a capacitance, means connected between said supply circuit and said capacitance for charging said capacitance, a control circuit for controlling the charging means and comprising an impedance element for producing a unidirectional voltage which varies in response to the charging current, a voltage divider connected across said capacitance, amplifier means comprising an electric discharge device having an anode, a cathode and a control grid, a second voltage divider comprising a source of negative unidirectional biasing potential and an impedance element for impressing a negative unidirectional biasing potential on said control grid, means selectively responsive to a component of voltage derived from the first mentioned voltage divider and the voltage appearing across the first mentioned impedance element and comprising an electric discharge device connected to said cathode and including two electric discharge paths one of which is connected to the first mentioned voltage divider and the other of which is connected to the first mentioned impedance element, and means for controlling said charging means in accordance with the anode-cathode current of said first mentioned electric discharge device.

17. In combination, a supply circuit, a capacitance, a charging circuit connected between said supply circuit and said capacitance, a control circuit for controlling the charging circuit and including means for producing a unidirectional voltage comprising an impedance element and a rectifier for transmitting variable amounts of current through said impedance element in response to the magnitude of the charging current, amplifier means comprising an electric discharge device having a cathode and a control grid, a voltage divider connected between said cathode and one terminal of said capacitance and including in series relation a source of negative unidirectional biasing potential and a second impedance element, means for connecting said control grid to said second impedance element, and means for selectively controlling the conductivity of said electric discharge device in response to the voltage appearing across the first mentioned impedance element and the voltage of said capacitance comprising a second voltage divider connected across said capacitance and an electric discharge device connected to said cathode and comprising two electric discharge paths one of which is connected to the first mentioned impedance element and the other of which is connected to a point of said second voltage divider.

18. In combination, a supply circuit, a capacitance, a charging circuit for said capacitance connected between said supply circuit and said capacitance, a control circuit for producing a unidirectional voltage for controlling said charging circuit and comprising a first impedance element and a rectifier for producing across said impedance element a unidirectional voltage which varies in accordance with the charging current, an amplifier responsive to the voltage appearing across said impedance element and for varying the magnitude of the first mentioned unidirectional voltage to effect charge of said capacitance at a constant rate and comprising an electric discharge device having a cathode and a control grid, a voltage divider connected between said cathode and one terminal of said capacitance and comprising in series relation a source of negative unidirectional biasing potential and a second impedance element, means for connecting said grid to said point of said second impedance element, and means for selectively controlling said electric discharge device in response to the charging current of said capacitance and the voltage of said capacitance comprising a second voltage divider connected across said capacitance and an electric discharge device connected to said cathode and including a pair of electric discharge paths one of which is connected to said second voltage divider and the other of which is connected to the first mentioned impedance element.

19. In combination, a supply circuit, a capacitance, charging means connected between said supply circuit and said capacitance, a control circuit for producing a unidirectional voltage and for controlling the current transmitted by said charging means, means for controlling the magnitude of said unidirectional voltage and comprising an electric discharge device having a cathode and a control grid, and a pair of control circuits for controlling the conductivity of said electric discharge device by controlling the relative voltages of said control member and said cathode, one of said control circuits including in series relation a source of negative unidirectional biasing potential and an impedance element connected between said cathode and one terminal of said capacitance and the other of said control circuits comprising a voltage divider connected across said capacitance and including a portion of the first mentioned impedance element.

20. In combination, a supply circuit, a capacitance, charging means connected between said supply circuit and said capacitance, means for controlling said charging means comprising an electric discharge device having an anode, a cathode and a control grid, a source of current for said electric discharge device and an impedance element connected in circuit with said source and the anode-cathode circuit of said discharge device, and means for controlling the conductivity of said electric discharge device to effect charge of said capacitance at a substantially constant rate until the voltage of said capacitance attains a predetermined value and for thereafter charging said capacitance to a predetermined voltage and comprising a circuit connected between said cathode and one terminal of said capacitance and including a source of negative unidirectional biasing potential and a resistance, means for connecting a point of said resistance to said control grid, means comprising a voltage divider connected across said capacitance, means for producing a unidirectional control voltage responsive to the charging current of said capacitance and comprising a second resistance and a rectifier for transmitting variable amounts of unidirectional current through said second resistance and means selectively responsive to the voltage appearing across said capacitance and the voltage produced by said second resistance and comprising an electric discharge device connected to said cathode and including a pair of electric discharge paths one of which is connected to the voltage responsive means and the other of which is connected to said second resistance.

21. In combination, a supply circuit, a capacitance, charging means connected between said supply circuit and said capacitance, means comprising an electric discharge device for producing a unidirectional voltage for controlling said charging means, said electric discharge device comprising an anode, a cathode and a control grid, means comprising a voltage divider connected across said capacitance for producing a component of voltage responsive to the voltage of said capacitance, a second voltage divider connected across said capacitance and comprising in series relation a capacitance and an impedance element, means selectively responsive to the voltage appearing across the first mentioned capacitance and the voltage of said impedance element for controlling the conductivity of said electric discharge device by controlling the relative voltages of said cathode and said control member to charge the first mentioned capacitance at a substantially constant rate until the voltage of said capacitance attains a predetermined value and for thereafter controlling the conductivity of said electric discharge device to effect charge of the first mentioned capacitance to a second predetermined voltage and comprising a pair of unidirectional conducting paths connected to said cathode, one of said unidirectional conducting paths being connected to the first mentioned voltage divider and the other unidirectional conducting path being connected to said impedance element, and means for controlling said charging means in accordance with the anode-cathode current of said electric discharge device.

22. In combination, a supply circuit, a capacitance, means for charging said capacitance, means including an electric discharge device for controlling said charging means, means for establishing a first control voltage which varies in accordance with the charging current, means for producing a second control voltage responsive to the terminal voltage of said capacitance, and means selectively responsive to said first and second control voltages for controlling said electric discharge device solely in accordance with the first of said voltages to charge said capacitance at a predetermined rate and thereafter controlling said discharge device solely in accordance with the other of said voltages when the relative magnitudes of said voltages attain a predetermined value.

ORRIN W. LIVINGSTON.

CERTIFICATE OF CORRECTION.

Patent No. 2,382,243.                                August 14, 1945.

ORRIN W. LIVINGSTON.

It is hereby certified that error appears in the printed specification of the above numbered patent requiring correction as follows: Page 6, first column, line 14, claim 4, for "responsive to voltage responsive" read --response to voltage response--; page 7, first column, line 33, claim 14, after "voltage" insert a comma; and second column, line 25, claim 17, strike out the comma after "having"; and that the said Letters Patent should be read with this correction therein that the same may conform to the record of the case in the Patent Office.

Signed and sealed this 25th day of December, A. D. 1945.

Leslie Frazer (Seal)                        First Assistant Commissioner of Patents.